J. B. BAUM.
TRUCK.
APPLICATION FILED FEB. 19, 1921.

1,424,438.

Patented Aug. 1, 1922.
2 SHEETS—SHEET 1.

J. B. Baum,
INVENTOR

BY *Victor J. Evans*
ATTORNEY

WITNESS:

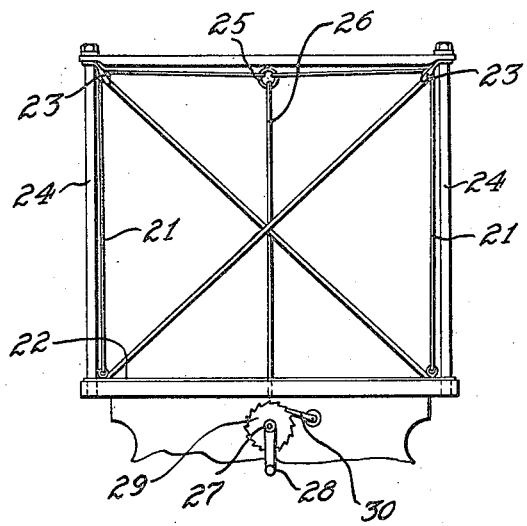
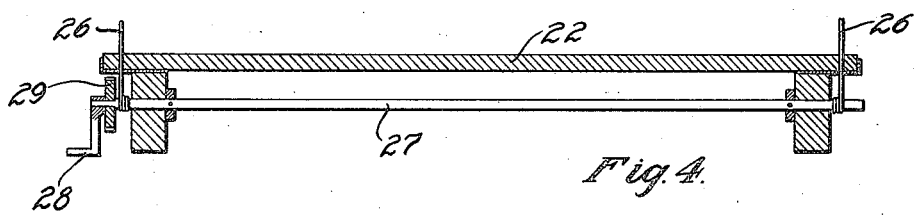
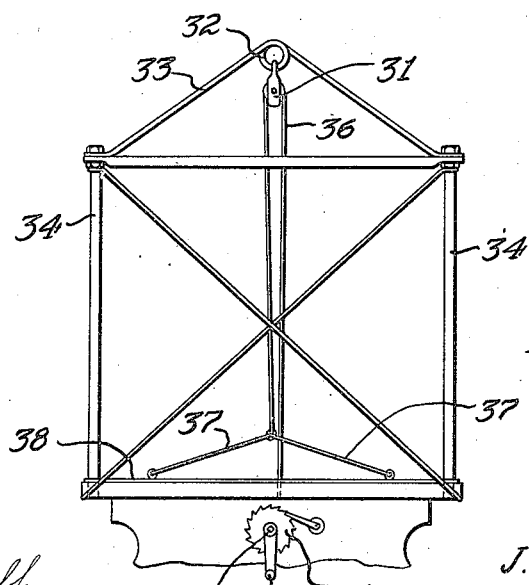

UNITED STATES PATENT OFFICE.

JAMES B. BAUM, OF GRAND JUNCTION, COLORADO.

TRUCK.

1,424,438.　　　　　Specification of Letters Patent.　　Patented Aug. 1, 1922.

Application filed February 19, 1921. Serial No. 446,318.

*To all whom it may concern:*

Be it known that I, JAMES B. BAUM, residing at Grand Junction, in the county of Mesa and State of Colorado, have invented new and useful Improvements in Trucks, of which the following is a specification.

This invention relates to trucks and comprehends a construction wherein the floor can be easily and quickly elevated with respect to the frame of the truck, so that the floor can be positioned in the same plane as the floor of a car to facilitate loading or unloading of the latter, means being provided to maintain the floor of the truck at any desired degree of elevation for this purpose.

The nature and advantages of the invention will be better understood when read in connection with the accompanying drawings, the invention residing in the combination, construction arrangement of parts as claimed.

In the drawings forming part of this application, like numerals of reference indicate similar parts in the several views and wherein:

Figure 3 is an end elevation of a modified construction.

Figure 4 is a fragmentary view showing the manner of raising and supporting the floor in accordance with the modification.

Figure 5 is an end elevation of a further modified form of the invention.

Figure 1:
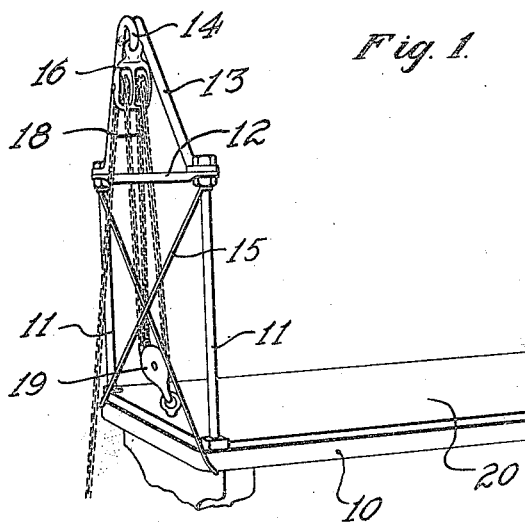
Figure 1 is a view of the truck showing the normal position of the floor thereof.
Figure 1:
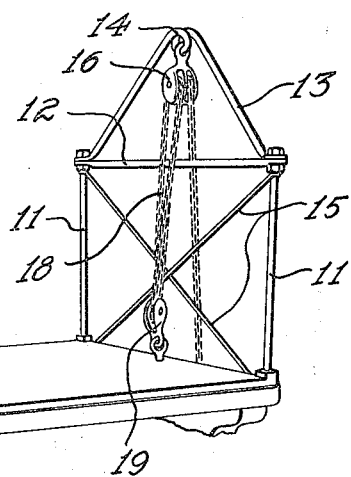
Figure 2:
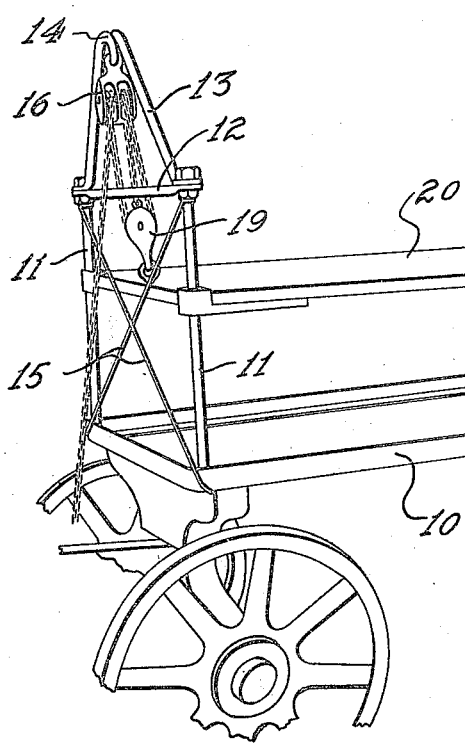
Figure 2 is a view showing the adjusted position of the floor of the truck.
Figure 2:
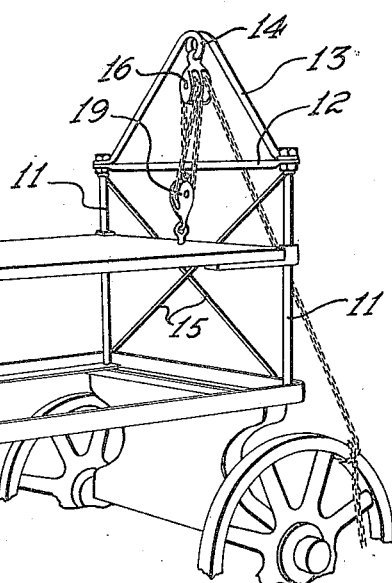

Referring to the drawings in detail, 10 indicates the frame of the truck from the ends of which rises the standards 11 which are connected in pairs by cross pieces 12. Also connected with the standards of each pair are the terminals of a supporting frame 13, the latter being of substantially inverted V-shaped formation and formed to provide an intermediate coil 14 for a purpose to be presently described. The uprights 11 of each pair are further braced by diagonally disposed bars 15. Suspended from the coil 14 of each supporting frame is a duplex pulley 16 about which is trained a chain 18, the latter being also trained about a pulley 19 suitably connected to the floor 20 of the truck. This arrangement is obviously the same at both ends, so that both ends of the floor can be elevated simultaneously. In practice, the chains are pulled upon in order to elevate the floor 20 with relation to the frame 10 of the truck, and it is obvious that the floor 20 can be arranged at a desired height, so that the floor may be arranged in the plane of the floor of a car to facilitate the loading or unloading of the latter as will be understood. The chain may be tied to the wheel or any other appropriate part of the truck as illustrated in Figure 2 in order to support the floor 20 in its adjusted or elevated position. The floor 20 is provided with openings to receive the standards 11, the latter constituting guides for the floor when it is being elevated or lowered.

In the modified form of the invention, illustrated in Figures 3 and 4, flexible elements 21 are connected to the floor 22 at spaced points, these elements being trained over suitable pulleys 23 which are mounted upon the standards 24. The flexible elements are connected as at 25 to an additional flexible element 26, the latter being secured to a shaft 27 which is equipped with a crank handle 28. Manifestly, when the shaft is rotated in the proper direction to wind the flexible element 26 thereabout, the floor is elevated sliding upon the standards in the manner herein above stated. The shaft 27 is equipped with a ratchet wheel 29 with which a pawl 30 co-operates to hold the floor in any desired elevated position.

In the modified form of the invention illustrated in Figure 5, a pulley 31 is suspended from the coil 32 formed in the supporting frame 33 in the same manner as described in connection with the preferred form of the invention, the supporting frame being associated with the standards 34. Trained over this pulley is a flexible element 36 which has one end provided with branches 37 secured to the floor 38 of the truck at spaced points. The opposite end of the flexible element is secured to a shaft 39 equipped with a crank handle 40, and when the shaft is rotated in a direction to wind the flexible element thereabout, the floor is elevated as will be readily understood. The pawl and ratchet indicated at 41 supports the floor in an elevated position.

While it is believed that from the foregoing description the nature and advantages of the invention will be readily apparent, I desire to have it understood that I do not limit myself to what is herein shown and that such changes may be resorted to when desired as fall within the scope of what is claimed.

What I claim is:

In a truck, a frame, standards rising from the corners of the frame, cross pieces connecting the standards at each end of the frame, said cross pieces being apertured to receive said standards, a floor slidably mounted on said standards, a wire frame substantially of inverted V-shaped formation, reposing upon each of said cross pieces, each frame terminating to provide eyes receiving the upper ends of said standards, an intermediate loop formed at the apex of each frame, a pulley suspended from each loop, and flexible elements trained over said pulleys and connected with said floor, whereby the latter may be moved toward and away from the frame.

In testimony whereof I affix my signature.

JAMES B. BAUM.